United States Patent [19]

Perry et al.

[11] 4,089,007

[45] May 9, 1978

[54] DIGITAL FLOW PRESSURE REGULATOR

[75] Inventors: Francis James Perry, Morgan Hill; Anthony Vesci, San Jose, both of Calif.

[73] Assignee: International Business Machines Corporation, Armonk, N.Y.

[21] Appl. No.: 689,702

[22] Filed: May 24, 1976

[51] Int. Cl.² .......................................... G01D 15/16
[52] U.S. Cl. .............................. 346/140 R; 137/110; 137/487.5; 346/75
[58] Field of Search ............... 346/140 R, 75; 137/8, 137/487.5, 110, 116.3, 486, 485, 12; 222/55

[56] References Cited

U.S. PATENT DOCUMENTS 2,958,333  11/1960  Poettmann .................... 137/8 X

*Primary Examiner*—Joseph W. Hartary
*Attorney, Agent, or Firm*—John H. Holcombe; Otto Schmid, Jr.

[57] ABSTRACT

A high pressure fluid source is connected to a primary orifice and a valved orifice of a binarily activated pressure regulator. The primary orifice alone supplies the fluid at a pressure below the minimum desired, and both orifices together supply the fluid at a pressure greater than the maximum desired. A sensor at the output is adjusted to open the binary valve when the minimum pressure is reached, and close the valve when the maximum pressure is reached, thus cycling between the two conditions.

4 Claims, 2 Drawing Figures

DIGITAL FLOW PRESSURE REGULATOR

BACKGROUND OF THE INVENTION

Pressurized ink jet printing systems require the supply of ink at relatively high pressures and relatively low flow rates. An example of a pressurized ink jet printing system is shown in Sweet et al, U.S. Pat No. 3,373,437 where pressurized electrically conductive fluid is ejected from a row of orifices for breaking into streams of uniform drops. As each drop breaks off from its fluid filament as ejected from the corresponding orifice, it may be selectively charged by an associated charge electrode. The charge electrodes are thus arranged in a row corresponding to and spaced from the row of orifices so that the fluid streams may pass therethrough. The drops then pass through an electrostatic deflection field and each drop is deflected a distance which is related to the magnitude of the drop charge. The drops may be charged binarily so that the uncharged drops are undeflected and continue past the deflection field to impact a recording medium for printing while the charged drops are deflected to a drop catcher or gutter.

The nozzles used in such an arrangement may, for example, be 8 mils in diameter. Thus, even though a hundred or more nozzles may be used, the total flow is still quite small. The customary devices used in such low flow rate situations are a relieving regulator or a relief valve. An example of such a system is illustrated in Helgeson et al U.S. Pat. No. 3,761,953 wherein a pressure tank has an inlet larger than the outlet causing the tank to fill so that the ink presses against a diaphragm or valve. Air at a regulated pressure is supplied to the opposite side of the diaphragm causing it to seal so long as the pressure of the ink within the vessel is below that of the pressure of the air. The input rate of the ink is greater than the output rate so that, at some point, the pressure of the ink within the vessel exceeds the pressure of the air in the cavity, opening the diaphragm or valve to relieve the pressure.

The difficulties with this or similar relief valve arrangements are that only the maximum pressure is regulated and that the pressure drop when the relief valve opens is relatively abrupt. This abruptness must then be compensated for by other controlled pressure regulators or by expansion chambers. The systems therefore become quite complex in order to be suitable for fluid handling systems having low flow rates, such as ink jet.

SUMMARY OF THE INVENTION

It is therefore an object of the present invention to provide a simplified, smoothly operating pressure regulation system for fluid handling systems having low flow rates.

In accordance with the present invention, a pressure regulator is provided for low flow rate fluid handling systems. The regulator includes two orifices and an outlet. One orifice is a primary orifice having an opening of such size as related to the fluid usage from the outlet so as to reduce at the outlet the pressure of a pressure source connected to the inlet to a value slightly less than a predetermined minimum value. A second orifice is a binary orifice also connected between the source and the outlet having an opening whose size is related to the usage of the fluid from the outlet and to the pressure of the source so that the binary orifice and primary orifice together supply the fluid to the outlet at a steady state pressure greater than a predetermined desired maximum value. A sensor is connected to the outlet and connected to a solenoid valve which connects the pressure source to the binary orifice. The sensor is arranged to close the valve upon the pressure at the outlet reaching the predetermined maximum value, and is arranged to open the valve upon pressure at the outlet reaching the predetermined minimum value.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1:
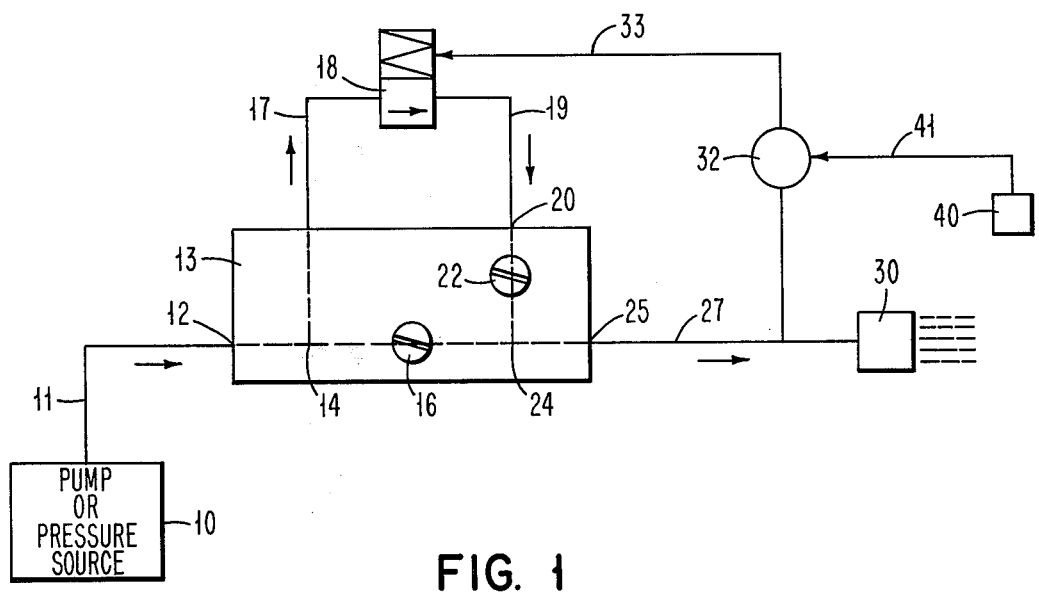
FIG. 1 is a schematic illustration of a fluid handling system incorporating the pressure regulator of the present invention.

Referring to FIG. 1, a pump or pressure source 10 supplies the fluid to be utilized, such as ink jet ink, on line 11 under a relatively high pressure. Line 11 may be connected to inlet 12 of orifice block 13. The orifice block is arranged so that the inlet 12 is connected to a "T" 14 which directs the fluid to an adjustable primary orifice 16 and also onto a line 17. Line 17 is connected to a binarily operated solenoid valve 18, which, in turn, is connected to line 19. Line 19 is connected to inlet 20 of orifice block 13 and directed to an adjustable binary orifice 22. The outputs of orifices 16 and 22 are interconnected at a "T" 24 and supplied at an outlet 25 onto line 27. The line 27 is connected to the fluid using mechanism, such as head 30 of an ink jet printing system. Also connected to line 27 is a pressure sensor 32. The sensor 32 is electrically connected to solenoid valve 18 via line 33 so as to operate the solenoid valve.

As an alternative structure, the solenoid valve 18 and lines 17 and 19 may be physically embedded within the orifice block 13. As still another alternative, no orifice block 13 may be supplied, but rather the orifice valves 16 and 22 and solenoid valve 18 may be interconnected by suitable lines and fittings.

For ink jet systems, it has been found to be advantageous to place the binary orifice 22 downstream of the solenoid valve 18 to minimize transient shocks from the solenoid operation.

As an example, the pressure source 10 may provide an output of approximately 80 psi and the pressure requirement of the ink jet head may be approximately 16 psi. To accomplish these conditions, the primary orifice is adjusted so that during continuous open flow conditions through only the primary orifice to the head 30, the resultant differential pressure on line 27 is 16 psi or slightly less. An example would be 15.9 psi. During the above measurement, the solenoid valve 18 which controls the flow through the binary orifice 22 is closed.

At this point, sensor 32 is adjusted to switch on and supply a signal on line 33 upon the pressure decreasing to 16 psi, and for terminating the signal on line 33 upon the pressure increasing to 16.1 psi. A signal on line 33 operates the solenoid valve 18 to allow fluid flow on line 19 and through binary orifice 22. The solenoid valve 18 is spring loaded so that termination of the signal on line 33 closes the valve, preventing flow through orifice 22.

Assuming that the solenoid valve is closed, the fluid flows only through adjustable primary orifice 16 from pressure source 10 to head 30. The pressure on line 27 will therefore gradually decrease toward 16 psi, the minimum operating pressure. If any further decrease in pressure occurs, sensor 32 supplies an electrical signal on line 33 to open solenoid valve 18 to allow a fluid flow to pass through the binary orifice 22. The additional flow will gradually cause an increase in pressure on line 27. The rate at which the pressure increases can be varied by turning a screw head which adjusts the size of the binary orifice 22. The binary orifice 22 may be larger or smaller than, or the same size as, primary orifice 16. Thus, the size determines the range of adjustment of the pressure increase rate. For ink jet, a fast rise time may be desirable for ink stream startup.

The adjustment of primary orifice 17 has the effect of controlling the rate at which the output pressure decreases.

Upon reaching the maximum pressure of 16.1 psi, the sensor 32 terminates the signal on line 33, allowing the spring to close the solenoid valve 18 and cut off the fluid flow through the orifice 22.

Any subsequent change in the fluid which can affect jet velocity, such as viscosity, filter restriction, temperature, etc., can be compensated for by changing the pressure limits on a pressure differential sensor 32 through a signal from a periodic velocity sensor 40 on line 41. As an alternative, solenoid valve 18 may be operated directly off of another type of sensor which is operated constantly and which senses a characteristic of the fluid, such as stream velocity for ink jet, which is related to the fluid pressure.

Figure 2:
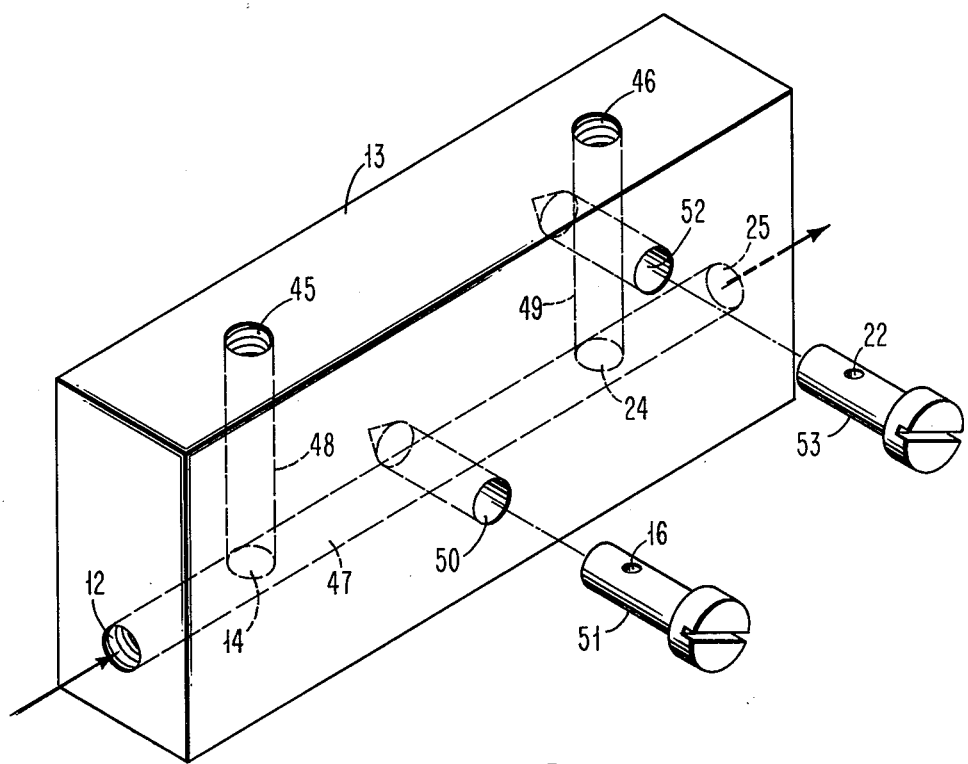
FIG. 2 is a perspective view of a pressure regulator orifice block of FIG. 1.

Referring to FIG. 2, an examplary orifice block 13 is illustrated. Orifice block 13 includes a threaded inlet 12, threaded outlet 25 and threaded connectors 45 and 46. The inlet 12 and outlet 25 are connected by means of hole 47 which extends through the block. "T" 14 connects the line 47 to connection point 45 by means of hole 48. Similarly, "T" 24 connects the line 47 to threaded connection 46 by means of hole 49. Line 47 is intercepted by means of hole 50 into which adjustable orifice pin 51 may be inserted. Similarly, line 49 is intercepted by hole 52 into which adjustable orifice pin 53 may be inserted.

Threaded connections are illustrated as common means for connecting fluid handling lines to block 13. However, suitable alternatives may also be used, such as push-on connections.

With the particular structure illustrated, the orifice block 13 is preferably a plastic block, for example acetal or polypropylene plastic, which may be used together with stainless steel orifice pins 51 and 53. The pins are press fit into holes 50 and 52, respectively, thereby forming a pressure seal with respect to fluid in the lines 47 or 49. Primary orifice 16 is drilled through pin 51 and binary orifice 22 is drilled through pin 53. Adjustment of the orifice size is accomplished merely by turning the head 55 or 56 of the respective pin 51 or 53 to close off portions of the orifice 16 or 22 in the block 13. This structure has been found to perform well with respect to ink jet systems, however, several alternative arrangements may be used, such as needle valves.

While the invention has been particularly shown and described with reference to a preferred embodiment thereof, it will be understood by those with skill in the art that the foregoing and other changes in form and details may be made therein without departing from the spirit and scope of the invention.

What is claimed is:

1. In an ink jet system including a head for projecting ink therefrom at a relatively constant low flow rate, and a source of ink at a high pressure, a pressure regulator for reducing and regulating the pressure of said ink at an output connected to said head, comprising:

a primary orifice connected between said source and said output for continuous transmission of said ink therethrough to said output at an output pressure of a predetermined low value;

a binary orifice connectable between said source and said output for transmission of said ink therethrough at said output at a flow such that continuous transmission therethrough in conjunction with said transmission from said primary orifice to said output produce an output pressure of a predetermined high value;

a binary valve for selectively fully opening and fully shutting off said ink transmission through said binary orifice; and sensor means connected to said output and responsive to said output pressure to fully open said binary valve upon said pressure dropping to a predetermined minimum value at least as high as said low value and to fully close said binary valve upon said pressure climbing to a predetermined maximum value at least as low as said high value.

2. The pressure regulator of claim 1 wherein:

said binary orifice is adjustable to various flow rates for transmission of said ink to thereby control the rate of increase of said output pressure.

3. The pressure regulator of claim 1 wherein:

said primary orifice is adjustable to various flow rates for transmission of said ink to thereby control the rate of decrease of said output pressure; and said binary valve is additionally connected between said source and said binary orifice for selectively opening and shutting off said fluid transmission to said binary orifice.

4. The pressure regulator of claim 1 additionally comprising:

output means connected to said output for receiving said fluid flow therefrom; and further sensing means responsive to a characteristic of said fluid acting with respect to said output means for altering said predetermined minimum and said predetermined maximum values of said sensor means.

* * * * *